US012579980B2

(12) United States Patent
Luncan et al.

(10) Patent No.: US 12,579,980 B2
(45) Date of Patent: Mar. 17, 2026

(54) APPARATUS AND METHOD FOR PROVIDING A WAKE-UP SIGNAL

(71) Applicant: JAGUAR LAND ROVER LIMITED, Whitley (GB)

(72) Inventors: Daniel Luncan, Whitley (GB); Jo Parkes, Whitley (GB); John Cockroft, Whitley (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 163 days.

(21) Appl. No.: 18/701,564

(22) PCT Filed: Oct. 18, 2022

(86) PCT No.: PCT/EP2022/078942
§ 371 (c)(1),
(2) Date: Apr. 15, 2024

(87) PCT Pub. No.: WO2023/066916
PCT Pub. Date: Apr. 27, 2023

(65) Prior Publication Data
US 2024/0420695 A1 Dec. 19, 2024

(30) Foreign Application Priority Data

Oct. 21, 2021 (GB) ..................................... 2115076

(51) Int. Cl.
G10L 15/22 (2006.01)
(52) U.S. Cl.
CPC ........ G10L 15/22 (2013.01); *G10L 2015/223* (2013.01)
(58) Field of Classification Search
CPC ......... G10L 15/22; G10L 15/28; G10L 17/22; G10L 25/87; G10L 2015/088; G10L 2015/223
See application file for complete search history.

(56) References Cited

U.S. PATENT DOCUMENTS 9,064,495 B1    6/2015  Torok et al.
12,217,736 B2*  2/2025  Sharifi .................... G10L 15/30
                        (Continued)

OTHER PUBLICATIONS

Great Britain Intellectual Property Office, Combined Search and Examination Report under Sections 17 and 18(3) Issued in Application No. GB2115076.8, Jul. 28, 2022, 11 pages.
(Continued)

*Primary Examiner* — Jakieda R Jackson
(74) *Attorney, Agent, or Firm* — McCoy Russell LLP

(57) ABSTRACT

A control system for a vehicle includes input means, memory means, and processing means, wherein a wake-up engine is arranged to determine a timestamp in dependence on a predetermined event associated with activation of the wake-up engine, analyse a received audio signal to detect an acoustic event indicative of a wake-up signal for a client application, provide an indication of the timestamp and an indication of the detection of the acoustic event comprising an indication of a time of a predetermined point in the audio signal associated with the acoustic event, wherein the indication is relative to the timestamp, wherein the client application is arranged to receive the indication of the timestamp and the indication of the detection, determine a current timestamp in dependence on receiving the indication of the detection, and determine, in dependence on the current timestamp, the first timestamp, and the indication of the time of the predetermined point in the audio signal, a position of the audio signal in the first buffer for initiating an audio session.

20 Claims, 5 Drawing Sheets

(56)     References Cited

U.S. PATENT DOCUMENTS

| | | | |
|---|---|---|---|
| 2014/0222436 A1* | 8/2014 | Binder .................... | G10L 17/24 |
| | | | 704/275 |
| 2015/0006176 A1* | 1/2015 | Pogue .................... | G10L 15/22 |
| | | | 704/249 |
| 2015/0302855 A1 | 10/2015 | Kim et al. | |
| 2017/0221475 A1* | 8/2017 | Bruguier .............. | G10L 15/065 |
| 2019/0304449 A1 | 10/2019 | Chang | |

OTHER PUBLICATIONS

ISA European Patent Office, International Search Report and Written Opinion Issued in Application No. PCT/EP2022/078942, Jan. 24, 2023, WIPO, 13 pages.

\* cited by examiner

600

Start

Receive ~610

Current time ~620

Pre-roll ~630

Communicate ~640

Receive ~650

100          710          700

720

APPARATUS AND METHOD FOR PROVIDING A WAKE-UP SIGNAL

CROSS REFERENCE TO RELATED APPLICATIONS

The present application is a U.S. National Phase of International Application No. PCT/EP2022/078942 entitled "APPARATUS AND METHOD FOR PROVIDING A WAKE-UP SIGNAL," and filed on Oct. 18, 2022. International Application No. PCT/EP2022/078942 claims priority to Great Britain Patent Application No. 2115076.8 filed on Oct. 21, 2021. The entire contents of each of the above-listed applications are hereby incorporated by reference for all purposes.

TECHNICAL FIELD

The present disclosure relates to an apparatus and method for providing a wake-up signal. In particular, although not exclusively, aspects of the present invention relate to providing a wake-up signal for a digital personal assistant. Aspects of the invention relate to a control system, to a system, and to a vehicle, to a method and to computer software.

BACKGROUND

It is known to utilise wake-up signals to activate functions of electronic devices. A wake-up signal is an acoustic event intended to trigger a function of a device or system. The acoustic event may be a particular noise or sound, or more commonly a spoken word or phrase such as "wake up" or the like. In particular, digital personal assistants (DPAs) are functionality built into either dedicated devices or hosted on computing devices which allow a user to interact with the device using spoken commands. For example, the user may speak a name of the DPA or a customised wake-up word to activate or wake up the DPA where the spoken name is the acoustic event which may be followed by a command or the user may wait to be invited to provide an audible command to the DPA. However, accurately detecting the acoustic event used as the trigger if difficult. For example, the acoustic event may be provided against background noise. Furthermore, the acoustic event particularly in the case of a spoken name or word, may be similar to other names or words against which it is necessary to discriminate.

In order to facilitate accurate detection of such acoustic events, it is known for a device to support first-pass detection of the acoustic event locally i.e. upon the device, such as detection of a wake-up word, following which an audio session is opened with a remote computing device, such as a server providing the digital personal assistant, whereby audio data is communicated from the device to the remote computing device for a second-pass detection of the acoustic event. Due to its increased computing power, the remote computing device is able to apply more sophisticated analysis to the audio data to ensure correct detection of the acoustic event. However it is difficult to provide the audio data to the remote computing device. One problem is that the audio data must be provided to the remote computer system accurately from a point in time prior to a time at which the first-pass local detection of the acoustic event is performed.

Furthermore, particularly when a digital personal assistant is implemented in a vehicle, since a journey may be relatively long, e.g. several hours, during which there may be little audible activity in the vehicle, i.e. long periods of silence, the local device may be required to process long periods of audio data before the acoustic event is detected. As a result, accurate timing of detection of the acoustic event for providing to the remote computing device is difficult. Previously timing has been performed with respect to a number of audio samples. However, especially where long periods exist between detections of the acoustic event, such as in a vehicle environment, this may be unreliable e.g. due to lost packets or samples.

It is an aim of the present invention to address one or more of the disadvantages associated with the prior art.

SUMMARY OF THE INVENTION

Aspects and embodiments of the invention provide a control system, a system, a vehicle, a method and computer software as claimed in the appended claims According to an aspect of the present invention there is provided a control system for a vehicle, the control system comprising one or more controllers, the control system comprising input means for receiving an audio signal, memory means arranged to store at least a portion of the received audio signal in a first buffer, processing means arranged to execute a wake-up engine, wherein the wake-up engine is arranged to determine a first timestamp in dependence on a predetermined event associated with activation of the wake-up engine, analyse the received audio signal to detect an acoustic event indicative of a wake-up signal for the client application, and communicate an indication of the first timestamp and an indication of the detection of the acoustic event comprising at least one indication of a time of a predetermined point in the audio signal associated with the acoustic event, wherein the at least one indication is relative to the first timestamp. Advantageously an indication of a time of the acoustic event in the audio signal is accurately communicated.

According to an aspect of the present invention there is provided a control system for a vehicle, the control system comprising one or more controllers, the control system comprising processing means arranged to execute a client application, wherein the client application is arranged to receive an indication of a first timestamp and an indication of the detection, determine a current timestamp in dependence on receiving the indication of the detection, and determine, in dependence on the current timestamp, the first timestamp, and the indication of the time of the predetermined point in the audio signal, a position of the audio signal in the first buffer for initiating an audio session. Advantageously a time of the acoustic event in the audio signal is accurately determined.

According to yet another aspect of the invention, there is provided a control system for a vehicle, the control system comprising one or more controllers, the control system comprising input means for receiving an audio signal, memory means arranged to store at least a portion of the received audio signal in a first buffer, processing means arranged to execute a wake-up engine and a client application, wherein the wake-up engine is arranged to determine a first timestamp in dependence on a predetermined event associated with activation of the wake-up engine, analyse the received audio signal to detect an acoustic event indicative of a wake-up signal for the client application, provide, to the client application, an indication of the first timestamp and an indication of the detection of the acoustic event comprising at least one indication of a time of a predetermined point in the audio signal associated with the acoustic event, wherein the at least one indication is relative to the first timestamp, wherein the client application is arranged to receive the indication of the first timestamp and the indication of the detection, determine a current timestamp in dependence on receiving the indication of the detection, and determine, in dependence on the current timestamp, the first timestamp, and the indication of the time of the predetermined point in the audio signal, a position of the audio signal in the first buffer for initiating an audio session. Advantageously an indication of a time of the acoustic event in the audio signal is accurately communicated.

Optionally the first buffer is arranged to store the at least a portion of the audio signal analysed by the wake-up engine. Advantageously the first buffer stores audio signal for use in the audio session. The first buffer may be associated with the client application. Advantageously the first buffer may be used by the client application.

The wake-up engine may be arranged to determine a second timestamp in dependence on the predetermined event associated with activation of the wake-up engine. The wake-up engine may provide an indication of the second timestamp to the client application. Advantageously the second time stamp may improve an accuracy of the determination of the time of the acoustic event.

The second timestamp is optionally determined after the determination of the first timestamp.

The second timestamp may be determined substantially immediately after the determination of the first timestamp. Advantageously the second time stamp may be used to determine a a system delay in obtaining the first and/or second timestamps.

The client application may be arranged to determine an indication of the system delay, tIPCDelay, as:

$$tIPCDelay = \frac{(\text{second\_timestamp} - \text{first\_timestamp})}{2}$$

Advantageously the determination of the system delay improves accuracy of determining the time of the acoustic event.

The at least one indication of the time of the predetermined point in the audio signal associated with the acoustic event may comprise an indication of a start time of the acoustic event in the audio signal, wherein the start time is relative to the first timestamp. Advantageously the start time of the acoustic event may be utilised in determining audio data to be communicated in the audio session.

The at least one indication of the time of the predetermined point in the audio signal of the acoustic event optionally comprises an indication of an end time of the acoustic event in the audio signal. Advantageously the indication of the end time of the acoustic event may be used in identifying a location or timing of the acoustic event in the audio data.

The position of the audio signal in the first buffer for initiating the audio session may be determined as a position prior to the time of the predetermined point in the audio signal of the acoustic event. Advantageously historic audio data may be communicated in the audio session.

The position of the audio signal in the buffer for initiating the audio session is optionally determined in dependence on tIPCDelay. The position of the audio signal in the buffer for initiating the audio session is optionally determined in dependence on a predetermined pre-roll period prior to the time of the predetermined point in the audio signal of the acoustic event. Advantageously the system delay and/or the pre-roll period may assist in accurately communicating audio data corresponding to the acoustic event.

Optionally the position of the audio signal in the buffer for initiating the audio session is determined as:

$$t_{audio\_session} =$$
$$\text{current\_timestamp} - (\text{first\_timestamp} + \text{start\_index} - \text{pre\_roll}) - tIPCDelay$$

wherein $t_{audio\_session}$ is the position of the audio signal in the buffer for initiating the audio session, start_index is the start time of the acoustic event and pre_roll is the pre-roll period. Advantageously the timing of the audio signal is accurately determined.

The pre-roll period may be between 250 ms and 1 second. The pre-roll period may be around 500 ms. Advantageously the pre-roll period may be used in accurately verifying the acoustic event.

The wake-up engine is arranged to request the first timestamp from a time source. Advantageously the time source may provide an accurate indication of the time.

The first buffer may be a circular buffer of a predetermined size. The circular buffer advantageously stored audio data on a continuous basis.

The predetermined size may be determined to store the audio signal representative of at least 5 seconds of audio. Optionally the predetermined size is determined to store the audio signal representative of around 10 seconds of audio. Advantageously the duration of the audio allows verification of the acoustic event.

The client application may be arranged to initiate the audio session by communicating the audio signal in the first buffer from the determined position to a remote computer system. Advantageously the remote computer system provides functionality to support determination of the acoustic event.

The client application is optionally arranged to continue communication of the received audio signal to the remote computer system following communication of the audio signal from the first buffer. Advantageously the audio is seamlessly provided to the remote computer system.

The audio signal in the first buffer may be communicated to the remote computer system from the determined position to an end of the audio signal stored in the first buffer. Advantageously the end of the audio signal in the first buffer represents latest audio data.

The received audio signal may be communicated to the remote computer system to follow the audio signal from the first buffer. Advantageously the audio signal is provided seamlessly to the remote computer system.

The control system may comprise memory means arranged to store the audio signal analysed by the wake-up engine in a second buffer prior to the first buffer. Advantageously the second buffer provides a link or pipe to the first buffer. The second buffer is optionally a FIFO buffer.

The client application is optionally arranged to continue the communication of the received audio signal from the second buffer to the remote computer. The acoustic event may be a wake-up word in the audio signal.

The wake-up engine may be arranged to determine a type of the acoustic event and to provide an indication of the type of the acoustic event to the client application.

According to yet another aspect of the invention, there is provided a system, comprising a control system according to an aspect of the invention, and a microphone system for providing the audio signal to the control system.

The system may comprise a communication means for communicating the audio session to a remote computer.

According to yet another aspect of the invention, there is provided a vehicle comprising a control system as described above or a system as described above.

According to yet another aspect of the invention, there is provided a computer-implemented method, comprising storing at least a portion of a received audio signal in a first buffer, determining a first timestamp in dependence on a predetermined event associated with activation of a wake-up engine, providing an indication of the first timestamp to a client application, analysing the received audio signal to detect an acoustic event indicative of a wake-up signal for the client application, providing an indication of the detection of the acoustic event to the client application, the indication comprising at least one indication of a time of a predetermined point in the audio signal associated with the acoustic event, wherein the at least one indication is relative to the first timestamp, determining a current timestamp in dependence on receiving the indication of the detection at the client application, and determining, in dependence on the current timestamp, the first timestamp, and the indication of the time of the predetermined point in the audio signal, a position of the audio signal in the first buffer for initiating an audio session.

The method may comprise determining a second timestamp in dependence on the predetermined event associated with activation of the wake-up engine, providing an indication of the second timestamp to the client application.

The method optionally comprises determining an indication of a system delay, tIPCDelay, as:

$$tIPCDelay = \frac{(second\_timestamp - first\_timestamp)}{2}$$

The method may comprise providing tIPCDelay to the client application.

The method may comprise initiating the audio session by communicating the audio signal in the first buffer from the determined position to a remote computer system.

According to yet another aspect of the invention, there is provided a computer readable instructions which, when executed by a computer, are arranged to perform a method as described above. Optionally the computer readable instructions are tangibly stored on a computer readable medium.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
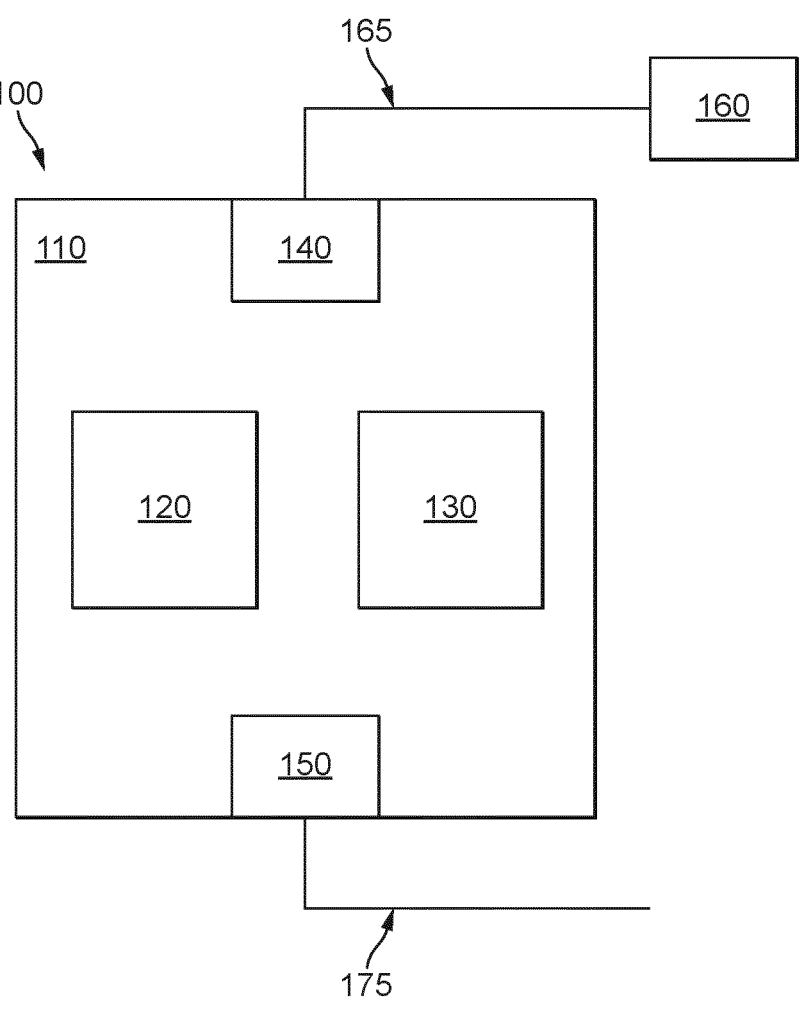
FIG. 1 shows a system according to an embodiment of the invention.
Figure 2:
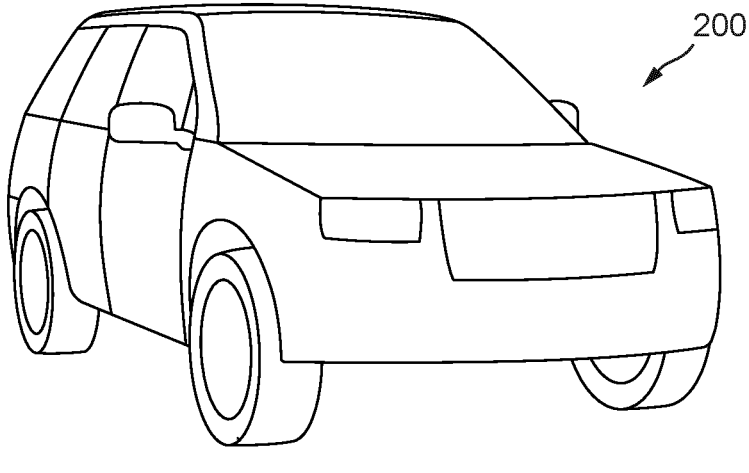
FIG. 2 shows a vehicle according to an embodiment of the invention.

A system 100 in accordance with an embodiment of the present invention is described herein with reference to the accompanying FIG. 1. The system 100 may in use be installed in a vehicle 200, such as illustrated in FIG. 2. The vehicle 200 in the illustrated embodiment is an automobile, such as a wheeled vehicle, but it will be understood that the system 100 may be used in other types of vehicle, such as aircraft and watercraft. It will also be appreciated that embodiments of the invention are useful in other environments not associated with vehicles, such as domestic and office environments, for example.

With reference to FIG. 1, the system 100 comprises a control system 110, which may be used with the vehicle 200. The control system 100 comprises one or more controller 110. The control system 110 illustrated in FIG. 1 comprises one controller 110 although it will be appreciated that the control system 110 may be formed by two or more controller 110 which act in combination. The system 100 is a system for detecting an acoustic event corresponding to a wake-up signal as will be explained. The system is arranged to initiate an audio session relating to the acoustic event.

Figure 7:
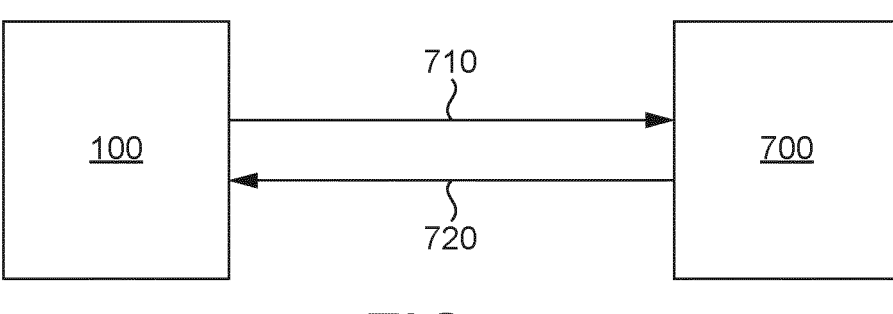
FIG. 7 illustrates a system and a remote computing device according to an embodiment of the invention.

The control system 110 is configured to receive an audio signal in the form of audio data 165 from one or more microphones 160. The control system 110 is arranged to determine timing information for the acoustic event with respect to the audio data 165, such that a location or timing of the acoustic event corresponding to the wake-up signal within the audio data 165 may be accurately identified. The control system 110 may be arranged to output processed audio data 175 in the form of an audio session for communicating to a remote computer system as will be explained with reference to FIG. 7.

As noted above, the control system 100 as illustrated in FIG. 1 comprises one controller 110, although it will be appreciated that this is merely illustrative. The controller 110 comprises processing means 120 and memory means 1130. The processing means 120 may be one or more electronic processing device 120 or processor 120 which operably executes computer-readable instructions. The memory means 130 may be one or more memory device 130 or memory 130. The memory 130 is electrically coupled to the processor 120. The memory 130 is configured to store instructions, and the processor 120 is configured to access the memory 130 and execute the instructions stored thereon.

The controller 110 comprises an input means 140 and an output means 150. The input means 140 may comprise an electrical input 140 of the controller 110. The output means 150 may comprise an electrical output 150 of the controller 110. The input 140 is arranged to receive the audio data 165 from the one or more microphones 160. The audio data 165 is an electrical signal which is indicative of the audio signal from the one or more microphones 160. The audio data 165 may be in the form of data samples each representing an audio value at a respective point in time. For example each audio sample may be 1-byte of audio data which may be sampled at a predetermined sampling rate. Alternatively the audio data may be an analogue audio signal which is sampled at the controller 110. The audio data may be received from one or more microphones 160, hereinafter microphone 160. The microphone 160 may be associated with an interior of the vehicle 200.

The output 150 is arranged to output the processed audio data 175 which is indicative of an audio signal for providing to the remote computer system (not shown) as an audio session. The audio session is a selected portion of the audio output from the microphone 160. The processed audio data 175 corresponding to the audio session may be output to a communication module (not shown) associated with the system 100 for wirelessly communicating the processed audio data 175 forming the audio session to the remote computer system.

Figure 3:
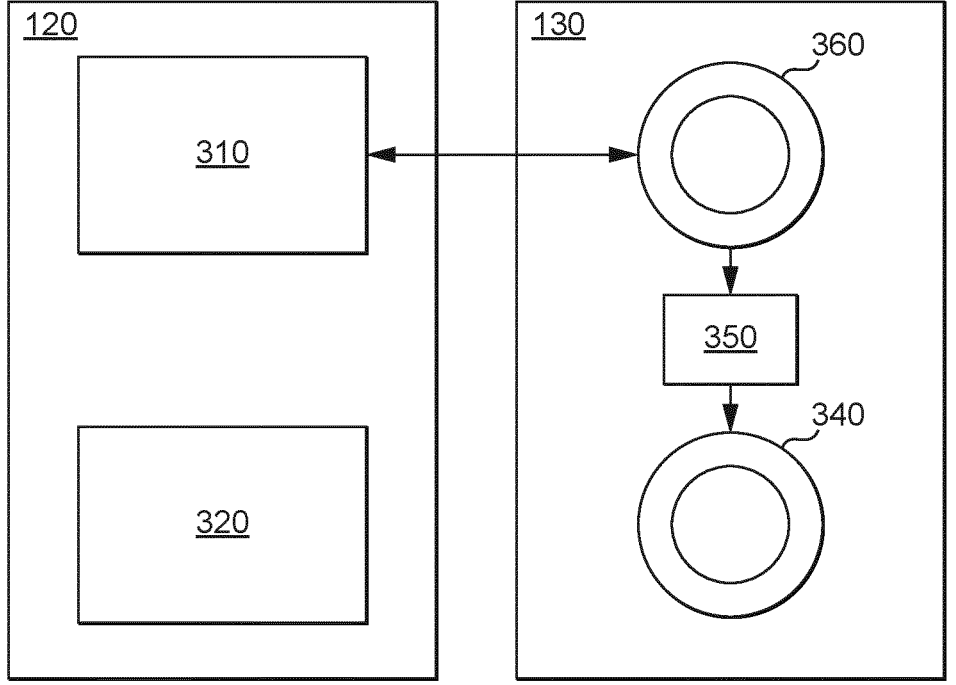
FIG. 3 shows an illustration of modules and data according to an embodiment of the invention.

FIG. 3 illustrates the processor 120 and memory 130 in relation to modules or components which are operably executed on the processor 120 and data structures, such as buffers, supported by the memory 130 according to embodiments of the present invention.

Referring to FIG. 3, the processor 120 operably executes a wake-up engine 310 and a client application 320. The wake-up engine 310 is arranged to detect an acoustic event, such as an utterance of a wake-up word (WuW), in the audio data 165 from the microphone 160 for indicating a start of an audible instruction or command to be provided to the remote computer system which may support a digital personal assistant (DPA) service. For example, the WuW may be a name of the DPA service, such as 'Bob', which is followed by the command e.g. 'turn on lights' as an example. It will be appreciated that the acoustic event may not be spoken and may be any sound or noise, such as a bark, corresponding to the wake-up signal.

The client application 320 is an application which is to be notified about the detection of the WuW by the wake-up engine 310. In some embodiments, the client application 320 may be associated with the remote computer system such as by being a locally executed application to support the remote computer system providing the DPA service. The client application 320 is arranged to initiate an audio session with the remote computer system when the wake-up engine 310 detects the acoustic event e.g. recognises the WuW in the audio data 165. The client application 320 may initiate the audio session to provide the remote computer system with audio data corresponding to the WuW and following audio data, such that utterance of the WuW can be verified by the remote computer system and a following audible command can be analysed by the remote computer system. The remote computer system may, in response, provide an indication to the client application 320 that the WuW was successfully recognised and data indicative of the command such that the client application 320 can provide or initiate a corresponding function e.g. control an operation of the system 100, provide an external signal indicative of the command, or signal another application executed on the processor 120.

A first buffer 340 is provided for storing audio data 165 received from the microphone 160. The audio data 165 stored in the first buffer 165 is audio data which has been analysed by the wake-up engine 310. As will be appreciated, at a point in time when the acoustic event, such as the WuW, is recognised by the wake-up engine 310, it will be necessary to provide audio data to the remote computer system prior to that point in time comprising audio data corresponding to the WUW 540. In some embodiments, a pre-roll period 530 of audio data is also provided, as will be explained with reference to FIG. 5. Thus, the first buffer 340 is relatively large such as storing at least one second of audio data. The first buffer 340 may be a circular buffer where data is initially written to a first position in the buffer and, once the first buffer 340 is full, data stored therein is continually overwritten from the first position onward. In this way, the circular first buffer 340 stores audio data corresponding to a period of time or time window preceding a current time. In some embodiments, the first buffer 340 may store at least 5 seconds or at least 10 seconds of audio data. In one embodiment the first buffer 340 stores 20 seconds of audio data, although other storage durations may be envisaged. The first buffer 340 may be associated with the client application 320.

The first buffer 340 is provided with the audio data 165 via a second buffer 350. The second buffer 350 may be a FIFO buffer. In some embodiments, the second buffer may be referred to as an audio pipe into which audio data is fed at a first end and audio data output from a second end with a period of audio data being temporarily stored therein within the second buffer 350. Data output from the second end is provided to the first buffer 340. The second buffer 350 stores audio data analysed by the wake-up engine 310 prior to the audio data being written to the first buffer 340. The second buffer 350 may be relatively small, such as storing data for less than 1 second, or 0.5 seconds. In one embodiment the second buffer 350 stores less than 200 ms of audio data 165 e.g. 140 ms of audio data, although it will be appreciated that this is merely an example. The second buffer 350 may provide a conduit for audio data between the wake-up engine 310 and the client application 320.

The wake-up engine 310 is associated with a third buffer 360. The third buffer 360 is for storing audio data for processing by the wake-up engine 310. In one embodiment, the third buffer 360 is a circular buffer into which received audio data 165 is stored and retrieved for processing by the wake-up engine 310. In other embodiments the third buffer may be a FIFO buffer, such as a FIFO pipe. In embodiments where the third buffer is a FIFO buffer, buffer manager may consume data from the FIFO buffer to ensure the third buffer does not become full or blocked. The third buffer 360 may be relatively small, such as holding audio data 165 corresponding to 100 ms or less. In one embodiment, for example, the third buffer 360 may store 20 ms of audio data. For a 8-bit sampling of audio the third buffer 360 may therefore be 640 bytes in size for 32 Hz audio sampling. It will be appreciated that this is merely an example and that other sizes of the third buffer 360 may be envisaged.

The memory 130 may implement any or all of the first, second and third buffers 340, 350, 360 as shown in FIG. 3. However it will be appreciated that one or more of the first, second and third buffers 340, 350, 360 may be implemented in dedicated hardware.

Figure 4:
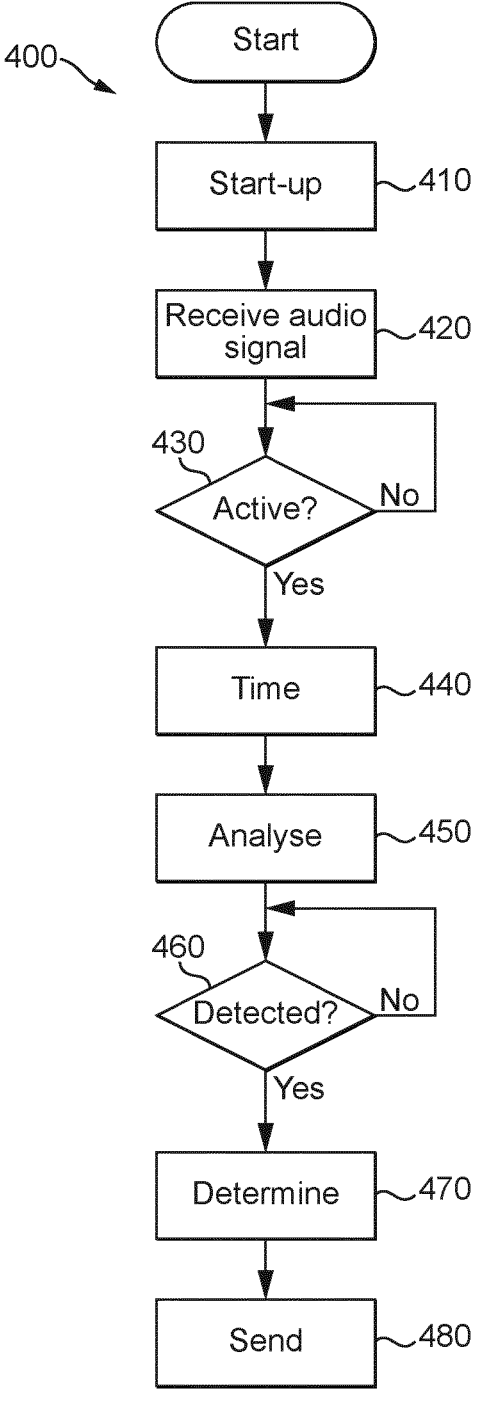
FIG. 4 shows a method according to an embodiment of the invention.

FIG. 4 illustrates a method 400 according to an embodiment of the invention. The method 400 is a method of detecting an acoustic event corresponding to a wake-up signal. In particular, the method 400 is a method of identifying audio data for an audio session to include the acoustic event corresponding to the wake-up signal. The method 400 may provide information associated with the detection to the client application 320 as will be explained. The method 400 may be performed by the system 100 illustrated in FIGS. 1 and 3. In particular, the memory 130 may comprise computer-readable instructions which, when executed by the processor 120, perform the method 400 according to an embodiment of the invention.

The method 400 will be explained with reference to FIG. 5 which illustrates audio data 165, 500 over a period of time provided by the microphone 160 to the system 100, as will be explained.

Figure 5:
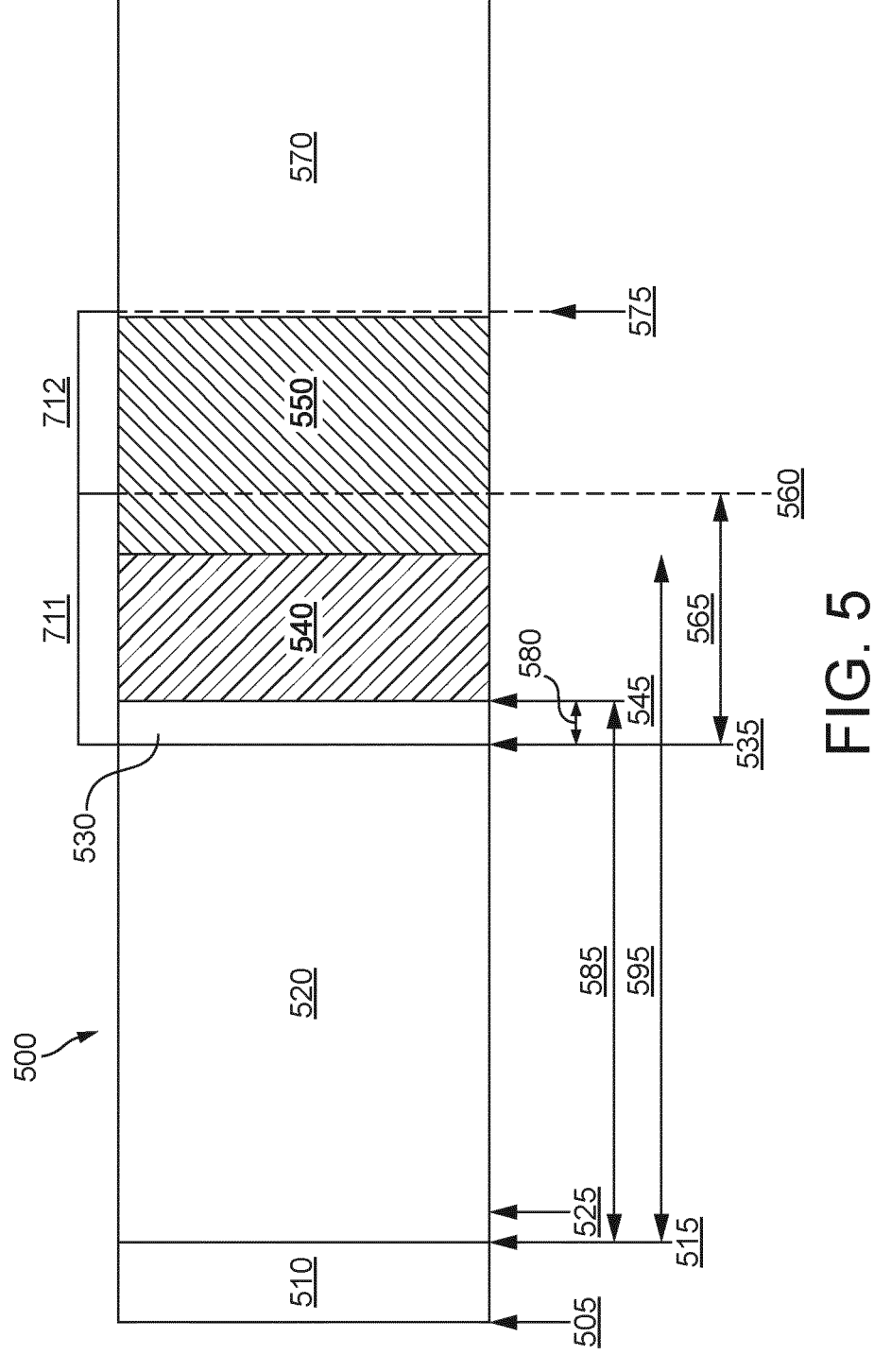
FIG. 5 illustrates timing of an audio signal according to an embodiment of the invention.

In block 410 of the method 400 at least a portion of the system 100 is initialised, with the initialisation beginning at time 505 indicated in FIG. 5. The time 505 may correspond to, for example, a power on of the controller 110 or receipt of a signal such as to initialise the wake-up engine 310. Time 505 may correspond to a change in power state of the vehicle 200. The initialisation process of the wake-up engine 310 takes a period of time, as indicated as period 510. Period 510 is an activation or start-up period during which one or more portions of the system 100 are becoming but not yet active, such as the wake-up engine 310 being activated e.g. loaded from memory 130 to be executed by the processor 120. During the start-up period 510 the wake-up engine 310 is not yet able to recognise the WuW in the audio data 165.

In block 420 the audio data 165 is received. It will be noted that although blocks 410 and 420 are shown as discrete blocks, in fact the audio data 165 may be generated by the microphone 160 and received by the controller 110 in block 420 whilst the wake-up engine 310 is being initialised in block 410. Furthermore, block 420 may continue whilst later steps of the method 400 are performed i.e. the audio data 165 may be continuously received by the controller 110.

Time 515 at end of the start-up period 510 is indicative of a time of a predetermined event associated with operation of the wake-up engine 310, such as a time at which the wake-up engine becomes operational and is able recognise the WuW in the audio data 165. The end of the start-up period 510 may alternatively correspond to a time at which the controller 110 is able to initiate an audio session with the remote computer system. Thus time 515 represents a predetermined event associated with activation of the wake-up engine 310. It will be appreciated that other events associated with activation of the wake-up engine 310 may be chosen, such as operation of a particular module within the wake-up engine 310.

Once the predetermined event occurs at time 515, the method moves to block 440. In block 440 at least a first timestamp is determined by the controller 110. The first timestamp is an indication of the time 515 at which the predetermined event, such as operation of the wake-up engine 310, occurs. The first timestamp may be a monotonic timestamp. By monotonic it is understood that the timestamp never decreases i.e. is continually increases in value. Each timestamp in block 440 is determined by the controller 110, such as by using an internal time clock. In other embodiments, the controller 110 may refer to a time source external to the controller 310 such as by requesting a time from the time source. In this way, the determined timestamp is accurate with respect to the local controller 310 or a network system in which the controller 310 is operational. Each timestamp may be obtained by the wake-up engine 310 making a request to a time source, such as to an operating system of the controller 310 on which the wake-up engine 310 is executed. In response to the request, the wake-up engine 310 is provided with the timestamp. Thus there may be a delay in between the wake-up engine 310 making the request for the time and being provided with the corresponding timestamp value.

In some embodiments, in block 440 a first timestamp is determined, such as by the wake-up engine 310 making a first request, at time 515 shown in FIG. 5. The first timestamp may correspond to a time to at which the wake-up engine 310 begins operating. In response, generally after a short delay, the timestamp is provided to the controller 310. However the short delay may be appreciable in terms of the received audio data 165, especially if the controller 110 is supporting other applications or modules and may be busy, or if the timestamp is obtained via a network which may carry other traffic. Therefore, to enable quantification of the delay, in some embodiments a second timestamp is obtained, such as at time 525 shown in FIG. 5. The determination of the second timestamp 525 may immediately follow the first timestamp 515 being obtained i.e. a request for the second timestamp 525 may be made as soon as the first timestamp 515 is received. Thus, in some embodiments, the first timestamp is obtained at time 515 and the second timestamp at time 525. The second timestamp 525 may be referred to as tNetworkDelayCorrection timestamp due to its potential use in determining a network or system delay correction factor. As will be explained below, the first and second timestamps 515, 525 may be used to calculate the delay in obtaining the first and second timestamp values, which may be referred to as the network or system delay correction factor tIPCDelay.

In block 450 of the method, the wake-up engine 310 analyses the received audio data 165, 500 to detect an acoustic event, such as the utterance of the WuW in the audio data 165, 500. In block 450 the wake-up engine 310 may compare the received audio data 165, 500 against one or more patterns of predetermined audio data 165, 500 corresponding to the WuW to determine if the received audio data 165, 500 is indicative of the utterance of the WuW. It will be appreciated that in some embodiments the wake-up engine 310 may analyse the audio data 165, 500 for more than one WuW or acoustic event i.e. there may be a plurality of WuWs for which the wake-up engine 310 analyses the audio data 165, 500.

During block 450 received audio data 165 corresponding to a period of time may be stored in the third buffer 360. The third buffer 360 is useful for ensuring that no audio data 165, 500 is lost and is able to be provided to the wake-up engine at a constant rate i.e. to buffer the audio data 165, 500 in case of delay e.g. due to system load. Data may be written to the third buffer 360 at a first position and read out of the third buffer 360 at a second position. Data read from the third buffer 360 is processed by the wake-up engine 310 and is written into the second buffer 350, i.e. the audio pipe 350 in some embodiments, which provides a conduit for the analysed audio data 165, 500 to be stored in the first buffer 340. The client application 320, such as an execution thread associated therewith, may read the audio data 165, 500 from the second buffer 350 and store the read audio data in the first buffer 340. Advantageously, as will be explained, the second buffer 350 assists in providing a continuous stream of audio data for an audio session, as will be explained.

In FIG. 5, time period 520 is an idle period during which the WuW is not recognised or identified in the audio data 165, 500 output by the microphone 160. The idle period 520 may be several minutes or longer, such as one or more hours e.g. during a journey of the vehicle 200.

In block 460 it is determined whether one of the one or more WuWs have been identified in the audio data 165. If not, the method 400 returns to block 450. Once the WuW is detected in the audio data 165, 500 the wake-up engine 310 determines in block 470 at least one indication of a time of at least one predetermined point in the audio data 165 associated with the acoustic event. The predetermined may be, for example at least one of a start and an end of audio data corresponding to the acoustic event. As will be explained, the at least one indication is relative to the first timestamp determined in block 440 i.e. to 515.

Referring to FIG. 5, a period 540 of the audio data 500 corresponds to utterance of the WuW i.e. WuW period 540. In other words, during the WuW period 540 between time points 545, 555 a person utters one of the WuWs, such as 'Bob', which the wake-up engine 310 is arranged to recognise in the audio data 165, 500 for example by comparison with predetermined audio data corresponding to the WuW. A period of time 550 following the WuW period 540 is an utterance period 550. The WuW is an acoustic event to signal a beginning of an audible command, following which the audible command is uttered by the person. For example, an utterance 'Bob play music' comprises the WuW 'Bob' uttered during WuW period 540 followed by the command 'play music'. The command 'play music' is uttered during the utterance period 550 following the WuW period 540.

Once the WuW has been detected in the audio data 165 by the wake-up engine 310, the method 400 moves to block 470. In block 470 the wake-up engine 310 is arranged to determine at least one indication of a time of a predetermined point 545, 555 in the audio data 165, 500 associated with the acoustic event i.e. the utterance of the WuW. The at least one indication is relative in time to the first timestamp i.e. to $t_0$ 515. In one embodiment, the wake-up engine 310 is arranged to determine an indication of a start time 545 of the acoustic event 540 in the audio signal 165, wherein the start time 545 is relative to the first timestamp 515. In one embodiment, the wake-up engine 310 is arranged to determine an indication of an end time 555 of the acoustic event 540 in the audio signal.

In one embodiment, the wake-up engine 310 is arranged to determine a start index 585 (startWuWindex) indicative of a time between the first timestamp to 515 and a start time 545 of the WuW period 540. The start index 585 may be determined by the wake-up engine 310 determining a timestamp corresponding to the start of the WuW period 540 and subtracting a time corresponding to $t_0$ 515. Similarly, in one embodiment, the wake-up engine 310 is arranged to determine an end index 595 (endWuWindex) indicative of a time between the first timestamp to 515 and an end time 555 of the WuW utterance period 540. The end index 595 may be determined by the wake-up engine 310 determining a timestamp corresponding to the end of the WuW period 540 and subtracting a time corresponding to $t_0$ 515. Thus, in one embodiment, the wake-up engine determines the start index 585 and the end index 595 corresponding to the WuW period 540 in the audio data 165, 500.

In some embodiments, where the wake-up engine 310 may recognise more than one acoustic event or WuW, the wake-up engine 310 is arranged to determine in block 470 an identification corresponding to the identified WuW. The identification may be an identification value. For example, the WuW may correspond to a first WuW having a first associated ID value, such as 1. Another, second, WuW may have a second associated ID value, such as 2. Advantageously the ID allows discrimination between different WuWs.

In block 480, the wake-up engine 310 provides, to the client application 320, an indication of the first timestamp 515 i.e. indicative of to and an indication of the detection of the acoustic event i.e. the WuW 540. The indication of the WuW 540 may comprise at least one indication of a time of a predetermined point 545, 555 in the audio signal 165 associated with the acoustic event 540. As discussed above, the indication of the predetermined point is relative to the first timestamp i.e. to 515.

In one embodiment, the wake-up engine 310 is arranged to provide to the client application 320 an indication of a time of to 515, such as the first timestamp, and an indication of one or both of the start index 585 and the end index 595 which are index values relative to to. In some embodiments, the wake-up engine 310 is arranged to further provide the second timestamp 525 to the client application 320 i.e. the value of tNetworkDelay Correction in some embodiments. As discussed above, to may be a monotonic time value.

Since recognition of the WuW by the wake-up engine 310 takes a finite processing time, the time at which block 480 is performed to provide the above-discussed information to the client application 320 is after the WuW period 540, likely during the utterance period 550. In the illustrated example, block 480 is performed at time 560 indicated in FIG. 5 within the utterance period 550 during which the user is likely to be uttering the following command, such as 'play music'.

Figure 6:
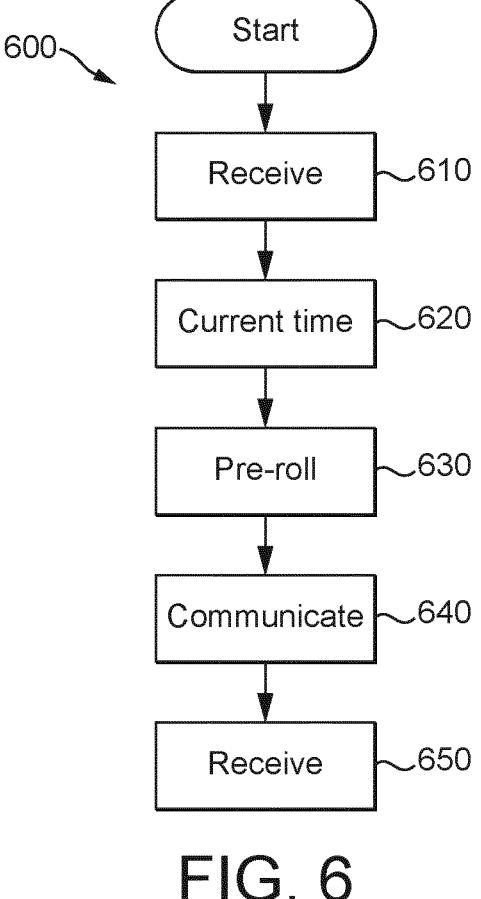
FIG. 6 illustrates a method according to an embodiment of the invention.

FIG. 6 illustrates a method 600 performed by the client application 320. The method 600 is a method of determining timing of an audio session by the client application 320.

In block 610 the client application 320 receives the indications provided by the wake-up engine 310 in block 480 as discussed above. At this point in time, such as at the current time 560 indicated in FIG. 5, audio data 165, 500 corresponding to the WuW period 540 is stored in the first buffer 340 which may be associated with the client application 320. Audio data 165, 500 such as corresponding to some of the utterance period 550, may also be stored in the first buffer 340 and the second buffer 350.

In block 620, the client application 320 is arranged to determine a current time 560 at which the indication of the WuW detection is received i.e. the time of block 610. In some embodiments, the client application 320 is arranged to request a current timestamp e.g. current_timestamp from a time source such as the system. The indication of the current time is a monotonic timestamp value in some embodiments.

In block 630 the client application 320 is arranged to determine a position of the audio data 165, 500 in the first buffer 340 at which an audio session 710 (referring to FIG. 7) is to be initiated. During the audio session 710, audio data 165, 500 at least comprising audio data corresponding to the WuW period 540 and the utterance period 550 is transmitted from the system 100 to a remote computer system 710. In order to initiate the audio session 710, the client application 320 determines in block 630 the position within the first buffer 340 from which audio data 165, 500 is to be transmitted to the remote computer system 700 in the audio session 710. The position within the buffer 340 is a point in time preceding the WuW period 540. In some embodiments, the position within the buffer 340 from which audio data 165, 500 is communicated is determined as a time 535 corresponding to a start of a pre-roll period 530. The pre-roll period 530 is a period of time which is provided prior to the WuW period 540 of audio data 500. The pre-roll period ensures that the audio session fully comprises the WuW period for analysis by the remote computer 700. In particular, the pre-roll period is useful in order to distinguish when the WuW is valid i.e. is intended to be used to wake the system. For example, if the WuW is used in a middle of a sentence, then it is likely not intended to wake the system.

In some embodiments, the position of the audio signal 165, 500 in the first buffer 340 for initiating the audio session 710 is determined in dependence the first timestamp 515 relating to $t_0$. In some embodiments, the second timestamp 525 i.e. tNetworkDelayCorrection may be used to determined the position. As discussed above, the first and second timestamps 515, 525 may be used to determine tIPCDelay indicative of the delay in obtaining the monotonic timestamp values. In some embodiments the client application is arranged to determine an indication of a system delay, tIPCDelay, as:

$$tIPCDelay = \frac{(\text{second\_timestamp} - \text{first\_timestamp})}{2}$$

The value of tIPCDelay may be used to determine the position in the first buffer 340 for the commencing the audio session 710. In some embodiments, the position of the audio signal 165, 500 in the first buffer 340 for initiating the audio session 710 is determined in dependence tIPCDelay and the predetermined pre-roll period. The pre-roll period (pre_roll) may be between 250 ms and 1 second. For example, the pre-roll period may be around 500 ms. It will be appreciated that other pre-roll periods may be used.

The position $t_{audio\_session}$ 535 of the audio signal 165 in the first buffer 340 for initiating the audio session 710 may be determined as:

$$t_{audio\_session} =$$
$$\text{current\_timestamp} - (\text{first\_timestamp} + \text{start\_index} - \text{pre\_roll}) - tIPCDelay$$

wherein start_index is the start index of the acoustic event i.e. the index startWuWindex 585 of the start of the WuW period 540 i.e. and pre_roll is the duration of the pre-roll period.

The audio session 710 comprises audio data 165, 500 from the first buffer 340 which is streamed from the time position $t_{audio\_session}$ as calculated above. The audio data from the first buffer 340 is audio data prior to the current time 560. The audio data streamed from the first buffer 340 is indicated in FIG. 5 as reference 711. Further audio data 165, 500 from the current time 560 is then streamed from the second buffer 350 i.e. as live audio data. The audio data may be streamed from the second buffer 350 until an end of speech in the audio data is detected, such as at time 575 when an idle period 570 begins. The value of the end index endWuWindex 595 may be communicated to the remote computer system 700.

In response to receiving the audio session 710, the remote computer system 700 is arranged to provide a response 720 indicative of confirmation of successful detection of the WuW in the audio data 165, 500 and an indication of the command spoken during the utterance period 550. For example, the command 'play music' may correspond to a predetermined value. When the client application 320 receives the response appropriate action may be taken to initiate the required command.

It will be appreciated that various changes and modifications can be made to the present invention without departing from the scope of the present application.

The invention claimed is:

1. A control system for a vehicle, the control system comprising one or more controllers, the control system comprising:

input means for receiving an audio signal;
memory means arranged to store at least a portion of the received audio signal in a first buffer; and
processing means arranged to execute a wake-up engine and a client application;

wherein the wake-up engine is arranged to:
determine a first timestamp in dependence on a predetermined event associated with activation of the wake-up engine;
analyse the received audio signal to detect an acoustic event indicative of a wake-up signal for the client application; and
provide, to the client application, an indication of the first timestamp and an indication of the detection of the acoustic event comprising at least one indication of a time of a predetermined point in the audio signal associated with the acoustic event, wherein the at least one indication is relative to the first timestamp;
wherein the client application is arranged to:
receive the indication of the first timestamp and the indication of the detection of the acoustic event;
determine a current timestamp in dependence on receiving the indication of the detection of the acoustic event; and
determine, in dependence on the current timestamp, the first timestamp, and the indication of the time of the predetermined point in the audio signal, a position of the audio signal in the first buffer for initiating an audio session.

2. The control system according to claim 1, wherein the wake-up engine is arranged to:
determine a second timestamp in dependence on the predetermined event associated with activation of the wake-up engine; and
provide an indication of the second timestamp to the client application.

3. The control system according to claim 2, wherein the client application is arranged to determine an indication of a system delay, tIPCDelay, as:

$$tIPCDelay = \frac{(\text{second\_timestamp} - \text{first\_timestamp})}{2}$$

4. The control system according to claim 3, wherein the position of the audio signal in the first buffer for initiating the audio session is determined as a position prior to the time of the predetermined point in the audio signal of the acoustic event.

5. The control system according to claim 4, wherein the position of the audio signal in the first buffer for initiating the audio session is determined in dependence on tIPCDelay and a predetermined pre-roll period prior to the time of the predetermined point in the audio signal of the acoustic event.

6. The control system according to claim 5, wherein the at least one indication of the time of the predetermined point in the audio signal associated with the acoustic event comprises an indication of a start time of the acoustic event in the audio signal, wherein the start time is relative to the first timestamp, and wherein the position of the audio signal in the first buffer for initiating the audio session is determined as:

$$t_{audio\_session} =$$
$$\text{current\_timestamp} - (\text{first\_timestamp} + \text{start\_index} - \text{pre\_roll}) - tIPCDelay$$

wherein $t_{audio\_session}$ is the position of the audio signal in the first buffer for initiating the audio session, start_index is the start time of the acoustic event and pre_roll is the predetermined pre-roll period.

7. The control system according to claim 1, wherein the at least one indication of the time of the predetermined point in the audio signal associated with the acoustic event comprises an indication of a start time of the acoustic event in the audio signal, wherein the start time is relative to the first timestamp.

8. The control system according to claim 7, wherein the at least one indication of the time of the predetermined point in the audio signal of the acoustic event comprises an indication of an end time of the acoustic event in the audio signal.

9. The control system according to claim 1, wherein the wake-up engine is arranged to request the first timestamp from a time source.

10. The control system according to claim 1, wherein the client application is arranged to initiate the audio session by communicating the audio signal in the first buffer from the determined position to a remote computer system.

11. The control system according to claim 10, wherein the client application is arranged to continue communication of the received audio signal to the remote computer system following communication of the audio signal from the first buffer.

12. The control system according to claim 11, wherein the control system comprises memory means arranged to store the audio signal analysed by the wake-up engine in a second buffer prior to the first buffer.

13. The control system according to claim 12, wherein the client application is arranged to continue the communication of the received audio signal from the second buffer to the remote computer system.

14. The vehicle according to claim 13, further comprising a microphone system for providing the audio signal to the control system.

15. The control system according to claim 1, wherein the wake-up engine is arranged to determine a type of the acoustic event and to provide an indication of the type of the acoustic event to the client application.

16. The control system of claim 1, wherein the first buffer is a circular buffer of a predetermined size.

17. The control system according to claim 1, wherein the acoustic event is a wake-up word in the audio signal.

18. A vehicle comprising a control system, the control system comprising one or more controllers, the control system comprising:

input means for receiving an audio signal;

memory means arranged to store at least a portion of the received audio signal in a first buffer; and processing means arranged to execute a wake-up engine and a client application;

wherein the wake-up engine is arranged to:

determine a first timestamp in dependence on a predetermined event associated with activation of the wake-up engine;

analyse the received audio signal to detect an acoustic event indicative of a wake-up signal for the client application; and provide, to the client application, an indication of the first timestamp and an indication of the detection of the acoustic event comprising at least one indication of a time of a predetermined point (545) in the audio signal associated with the acoustic event, wherein the at least one indication is relative to the first timestamp;

wherein the client application is arranged to:

receive the indication of the first timestamp and the indication of the detection of the acoustic event;

determine a current timestamp in dependence on receiving the indication of the detection of the acoustic event; and determine, in dependence on the current timestamp, the first timestamp, and the indication of the time of the predetermined point in the audio signal, a position of the audio signal in the first buffer for initiating an audio session.

19. A computer-implemented method, comprising:

storing at least a portion of a received audio signal in a first buffer;

determining a first timestamp in dependence on a predetermined event associated with activation of a wake-up engine;

providing an indication of the first timestamp to a client application;

analysing the received audio signal to detect an acoustic event indicative of a wake-up signal for the client application;

providing an indication of the detection of the acoustic event to the client application, the indication comprising at least one indication of a time of a predetermined point in the received audio signal associated with the acoustic event, wherein the at least one indication is relative to the first timestamp;

determining a current timestamp in dependence on receiving the indication of the detection at the client application; and determining, in dependence on the current timestamp, the first timestamp, and the indication of the time of the predetermined point in the received audio signal, a position of the received audio signal in the first buffer for initiating an audio session.

20. The computer-implemented method according to claim 19, further comprising:

determining a second timestamp in dependence on the predetermined event associated with activation of the wake-up engine; and providing an indication of the second timestamp to the client application.

* * * * *